United States Patent
Wang et al.

(10) Patent No.: US 7,394,503 B2
(45) Date of Patent: Jul. 1, 2008

(54) MOTION DETECTION CIRCUIT AND METHOD

(75) Inventors: Chua-Chin Wang, Kaohsiung (TW);
Chih-Yi Chang, Tainan County (TW);
Fung-Jane Chang, Tainan County (TW)

(73) Assignees: National Sun Yat-Sen University (TW);
Himax Technologies Limited (TW)

( * ) Notice: Subject to any disclaimer, the term of this patent is extended or adjusted under 35 U.S.C. 154(b) by 582 days.

(21) Appl. No.: 11/171,995

(22) Filed: Jun. 30, 2005

(65) Prior Publication Data

US 2007/0002171 A1  Jan. 4, 2007

(51) Int. Cl.
*H04N 7/18* (2006.01)
(52) U.S. Cl. .................................. 348/700
(58) Field of Classification Search ............ 348/663, 348/666, 700–702, 155
See application file for complete search history.

(56) References Cited

U.S. PATENT DOCUMENTS

| 4,651,211 | A | * | 3/1987 | Weckenbrock et al. | 348/702 |
| 5,430,500 | A | * | 7/1995 | Hoshino et al. | 348/701 |
| 5,502,509 | A | * | 3/1996 | Kurashita et al. | 348/669 |
| 6,512,537 | B1 | * | 1/2003 | Shimizu et al. | 348/155 |
| 7,046,306 | B2 | * | 5/2006 | Zhai et al. | 348/666 |
| 2005/0030381 | A1 | * | 2/2005 | Tanigawa | 348/155 |
| 2006/0268179 | A1 | * | 11/2006 | Renner et al. | 348/666 |

\* cited by examiner

*Primary Examiner*—Paulos M Natnael
(74) *Attorney, Agent, or Firm*—Kinney & Lange, PA

(57) ABSTRACT

Successive video signals of a first frame and a second frame are received. A signal difference between the video signals is determined and filtered to obtain a luminance difference. A signal sum of the video signals is determined and filtered to obtain a luminance sum. The luminance sum is subtracted from the signal sum to obtain a chrominance difference.

15 Claims, 5 Drawing Sheets

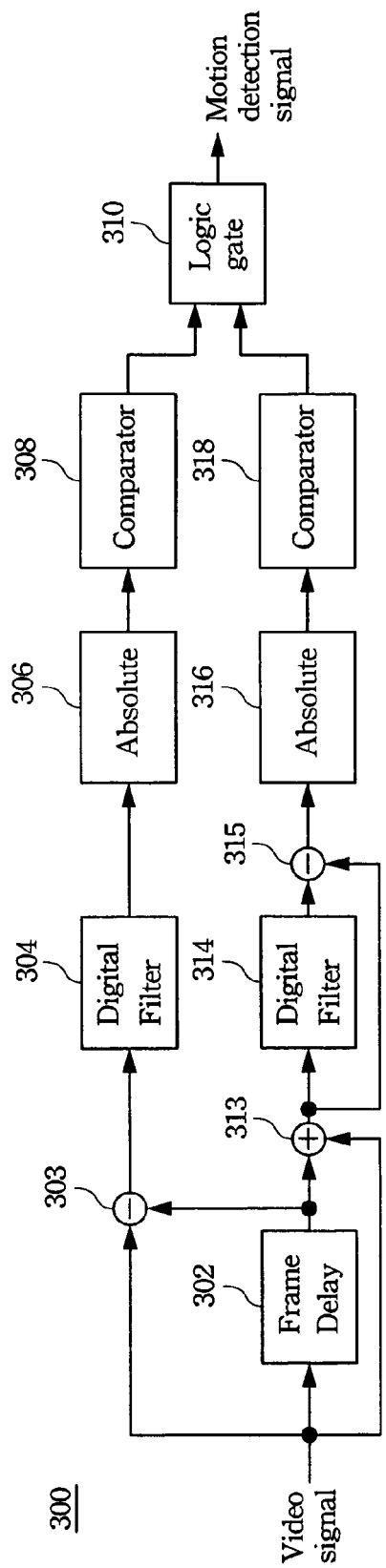
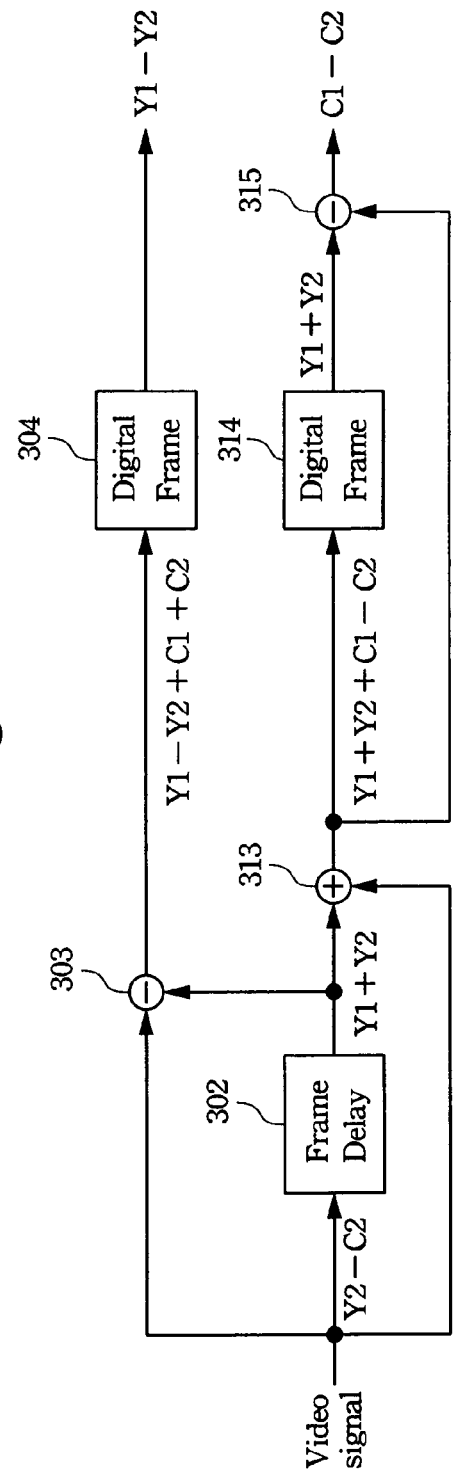
Fig. 3A
Fig. 3B

MOTION DETECTION CIRCUIT AND METHOD

BACKGROUND

1. Field of Invention

The present invention relates to color television systems. More particularly, the present invention relates to a motion detection circuit and method for video decoders.

2. Description of Related Art

In composite video television systems such as NTSC and PAL, luminance and chrominance information share a portion of the total signal bandwidth. In NTSC, for example, chrominance information is encoded on a sub-carrier of 3.579545 MHz. Within the chrominance band which extends from roughly 2.3 MHz to 4.2 MHz, both the chrominance and luminance spectra are intermingled. A television decoder extracts both luminance information and chrominance information from composite signals. Since different comb filters are separately needed for decoding static pictures and motion pictures, a decision circuit, called a motion detection circuit, is used to decide whether the pictures are moving or not.

A composite NTSC video signal can be simply represented as a combination of luminance information (Y) and chrominance information (C). Generally, the luminance information is of the lower frequency components of the composite NTSC video signal, and the chrominance information is of the higher frequency components of the composite NTSC video signal.

FIG. 1 illustrates a schematic view of composite NTSC video signals of three successive frames in a conventional signal encoding manner. The composite NTSC video signals of the first, second and third frames are encoded as Y+C, Y−C and Y+C, respectively, in consideration of the sub-carrier balance. In other words, the luminance information and chrominance information of adjacent frames are of opposite phase relations.

FIG. 2A is a schematic circuit diagram of a conventional motion detection circuit 200, which has two processing paths for respectively detecting luminance and chrominance information of video signals. A video signal comprising both luminance and chrominance information is received and passes through frame delays 202 and 212. The difference in luminance information between two successive frames is determined by a subtracter 203, rectified by a digital filter 204 and an absolute circuit 206 (i.e. for obtaining absolute value), and compared to a reference value in a comparator 208.

FIG. 2B is a partial circuit diagram of the chrominance processing path in FIG. 2A, especially illustrating the processing of the video signals of successive frames. The difference in chrominance information between two frames Y+C3 and Y+C1 spaced one frame apart as Y−C2 is determined by a subtracter 213, rectified by an absolute circuit 216, and compared with another reference value in a comparator 218. A logic gate 210 decides whether the successive video signals are moving or not according to at least one of the first comparing value and the second comparing value from the comparators 208 and 218.

Since the video signals of adjacent frames have opposite phase relations of luminance and chrominance information, the conventional motion detection circuit 200 needs two frame delays 202 and 212 to deal with the chrominance information. However, the frame buffers of the frame delays are very large and expensive, such that the conventional motion detection circuit is inadequate for products.

SUMMARY

It is therefore an aspect of the present invention to provide a method for detecting frame motion, which simplifies the conventional method having more frame delay steps.

According to one preferred embodiment of the present invention, successive video signals of a first frame and a second frame are received. A signal difference between the video signals is determined and filtered to obtain a luminance difference. A signal sum of the video signals is determined and filtered to obtain a luminance sum. The luminance sum is subtracted from the signal sum to obtain a chrominance difference.

According to another preferred embodiment of the present invention, a video signal of a first frame is delayed. A signal difference between the delayed video signal of the first frame and a video signal of a second frame and a signal sum of the delayed video signal of the first frame and the video signal of the second frame are determined. A luminance difference is derived from the signal difference. A luminance sum is derived from the signal sum, and a chrominance difference is obtained by subtracting the luminance sum from the signal sum.

It is another aspect of the present invention to provide a motion detection circuit, which omits one frame delay to reduce the occupied area and decrease the cost thereof. According to one preferred embodiment of the present invention, the motion detection circuit has a frame delay, a luminance subtracter, a luminance digital filter, an adder, a chrominance digital filter and a chrominance subtracter. The frame delay delays a video signal of a first frame. The luminance subtracter determines a signal difference between the delayed video signal of the first frame and a video signal of a second frame. The luminance digital filter derives a luminance difference from the signal difference. The adder determines a signal sum of the delayed video signal of the first frame and a video signal of a second frame. The chrominance digital filter derives a luminance sum from the signal sum. The chrominance subtracter subtracts the luminance sum from the signal sum to obtain a chrominance difference.

In conclusion, the invention omits one frame delay of the conventional motion detection circuit, such that the large occupied area is reduced and the high cost due to the expensive frame buffers is also decreased. It is to be understood that both the foregoing general description and the following detailed description are examples and are intended to provide further explanation of the invention as claimed.

BRIEF DESCRIPTION OF THE DRAWINGS

These and other features, aspects and advantages of the present invention will become better understood with regard to the following description, appended claims, and accompanying drawings where:

FIG. 3A is a schematic circuit diagram of one preferred embodiment of the present invention;

FIG. 3B is a partial circuit diagram of the luminance and chrominance processing paths in FIG. 3A;

DESCRIPTION OF THE PREFERRED EMBODIMENTS

Figure 1:
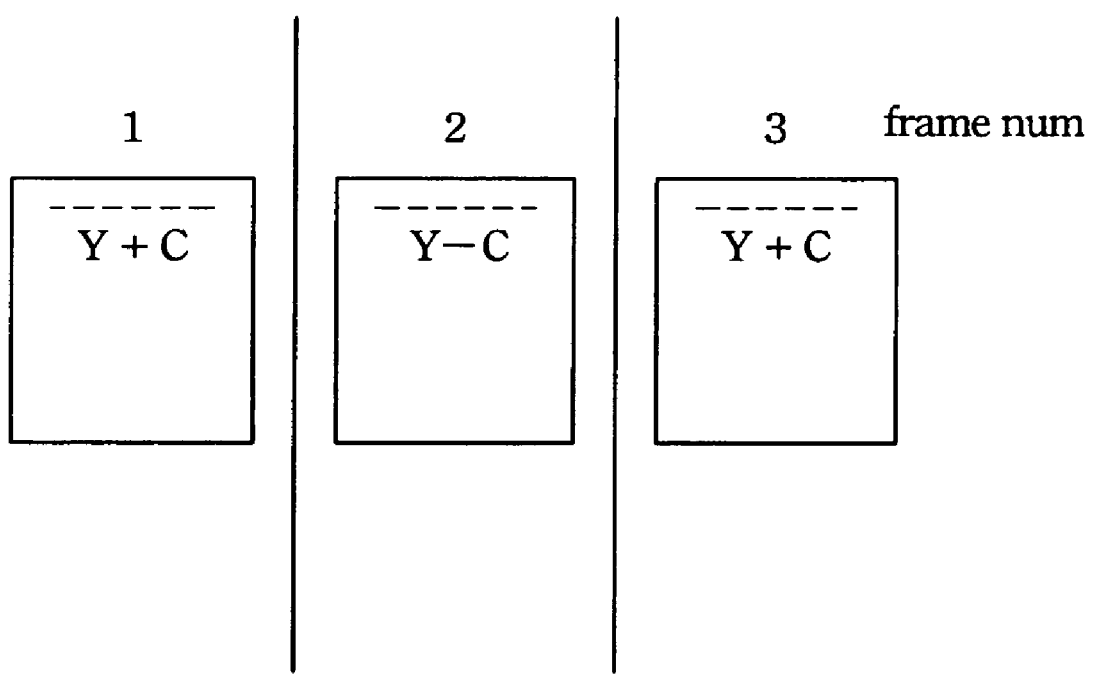
FIG. 1 illustrates a schematic view of composite NTSC video signals of three successive frames in a conventional signal encoding manner.
Figure 2A:
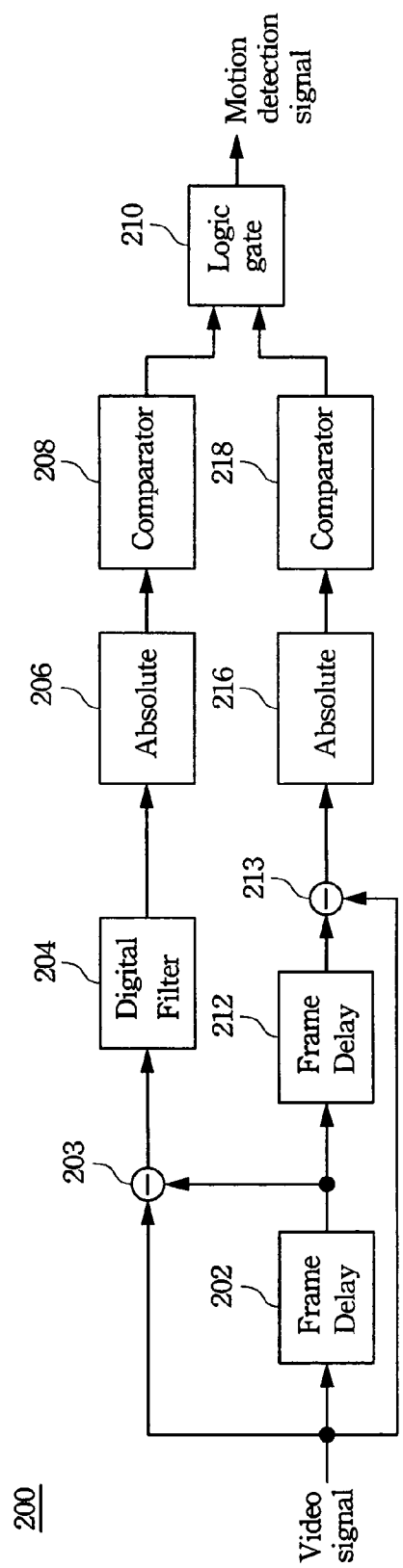
FIG. 2A is a schematic circuit diagram of a conventional motion detection circuit.
Figure 2B:
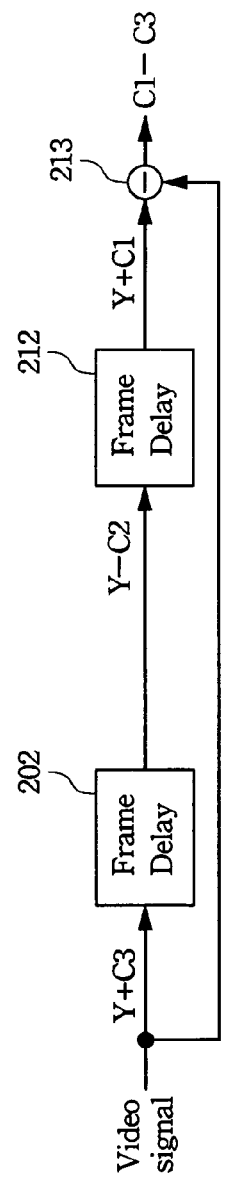
FIG. 2B is a partial circuit diagram of the chrominance processing path in FIG. 2A.

Reference will now be made in detail to the present preferred embodiments of the invention, examples of which are illustrated in the accompanying drawings. Wherever possible, the same reference numbers are used in the drawings and the description to refer to the same or like parts.

The present invention uses a digital filter and an adder instead of one frame delay used in the conventional motion detection circuit as mentioned above. Moreover, the present invention needs only two frames to decide whether the successive video signals are moving or not, rather than three frames of the conventional motion detection circuit and method.

For easy interpretation, in the following embodiments, the video signal of the first frame is defined as Y1+C1, and the video signal of the second frame is defined as Y2−C2, referring to the conventional signal encoding manner as illustrated in FIG. 1. Moreover, persons skilled in the art should understand that circuit components of different functions in the preferred embodiments can be combined, separated or integrated with other circuits according to the design requirements, and are not limited by the following descriptions and drawings.

FIG. 3A is a schematic circuit diagram of one preferred embodiment of the present invention. FIG. 3B is a partial circuit diagram of the luminance and chrominance processing paths in FIG. 3A, especially illustrating the detailed processing of the video signals of successive frames. A motion detection circuit 300 has a frame delay 302, a luminance subtracter 303, a luminance digital filter 304, an adder 313, a chrominance digital filter 314 and a chrominance subtracter 316.

The frame delay 302 delays a video signal of a first frame Y1+C1. The luminance subtracter 303 determines a signal difference Y1−Y2+C1+C2 between the delayed video signal of the first frame Y1+C1 and a video signal of a second frame Y2−C2. The luminance digital filter 304 derives a luminance difference Y1−Y2 from the signal difference Y1−Y2+C1+C2.

The adder 313 determines a signal sum Y1+Y2+C1−C2 of the delayed video signal of the first frame Y1+C1 and a video signal of a second frame Y2−C2. The chrominance digital filter 314 derives a luminance sum Y1+Y2 from the signal sum Y1+Y2+C1−C2. The chrominance subtracter 315 subtracts the luminance sum Y1+Y2 from the signal sum Y1+Y2+C1−C2 to obtain a chrominance difference C1−C2.

More precisely, the video signals are successive composite television signals, such as composite NTSC video signals, each of which having luminance and chrominance information. The luminance subtracter 303 subtracts the video signal of the second frame Y2−C2 from the delayed video signal of the first frame Y1+C1 to determine the signal difference Y1−Y2+C1+C2. The adder 313 adds the video signal of the second frame Y2−C2 and the delayed video signal of the first frame Y1+C1 to determine the signal sum Y1+Y2+C1−C2. The luminance digital filter 304 and the chrominance digital filter 314 are low-pass filters. Furthermore, absolute circuits 306 and 308 are optionally used to ensure that the luminance difference Y1−Y2 and the chrominance difference C1−C2 are preferably positive values.

In addition, the motion detection circuit 300 further has a luminance comparator 308, a chrominance comparator 318 and a logic gate 310. The luminance comparator 308 compares the luminance difference Y1−Y2 to a first reference value to obtain a first comparing value. The chrominance comparator 318 compares the chrominance difference C1−C2 to a second reference value to obtain a second comparing value. The logic gate 310 decides whether the two video signals are moving or not according to at least one of the first comparing value and the second comparing value, and further can generate a motion detection signal for indicating it.

Besides the abovementioned motion detection circuit, the preferred embodiments of the present invention also provide methods for detecting frame motion in two aspects as follows. These two preferred embodiments can both simplify the conventional method, and thus only two frames are needed for deciding frame motion.

Figure 4:
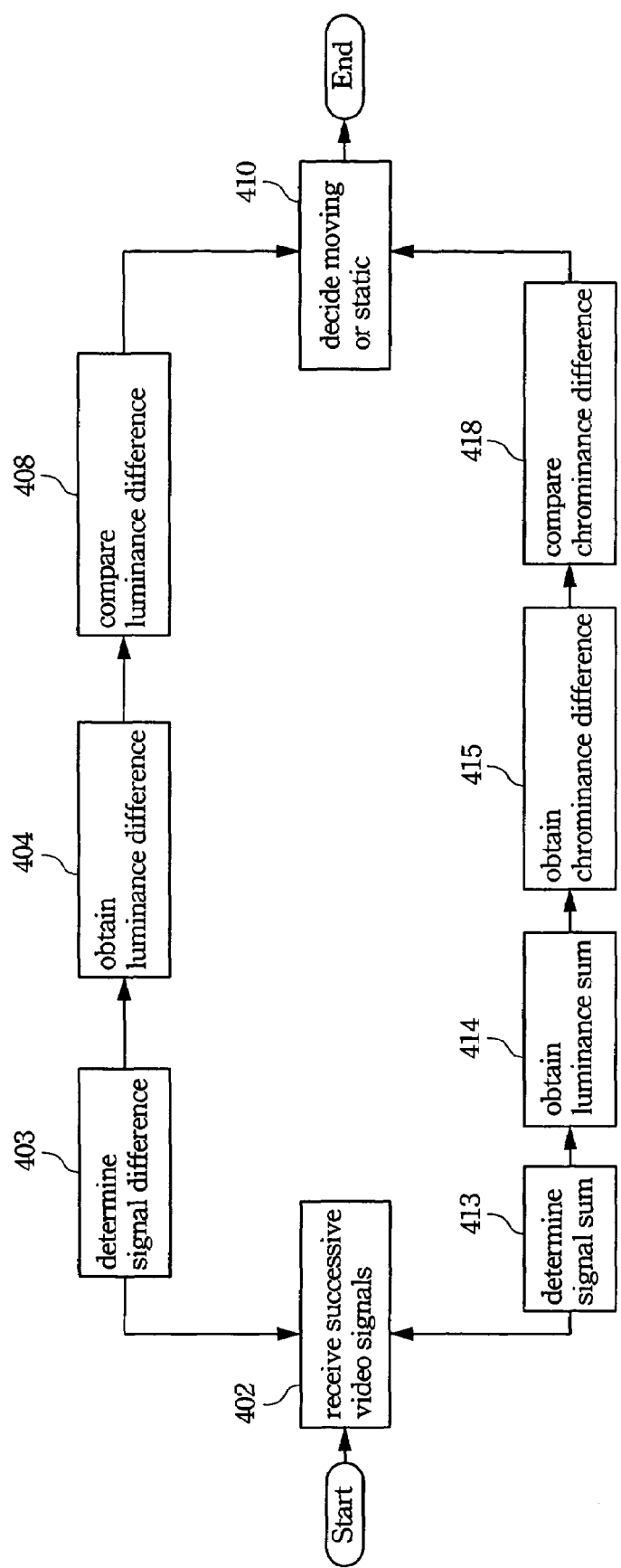
FIG. 4 is a flow chart of one preferred embodiment of the present invention.

FIG. 4 is a flow chart of one preferred embodiment of the present invention. For clarity, the following descriptions are made with reference to FIGS. 3A and 3B. Successive video signals of a first frame Y1+C1 and a second frame Y2−C2 are received (step 402). A signal difference Y1−Y2+C1+C2 between the video signals Y1+C1 and Y2−C2 is determined (step 403) and filtered to obtain a luminance difference Y1−Y2 (step 404). A signal sum Y1+Y2+C1−C2 of the video signals Y1+C1 and Y2−C2 is determined (step 413) and filtered to obtain a luminance sum Y1+Y2 (step 414). The luminance sum Y1+Y2 is subtracted from the signal sum Y1+Y2+C1−C2 to obtain a chrominance difference C1−C2 (step 415).

More precisely, the video signals are composite television signals, such as composite NTSC video signals, each of which having luminance and chrominance information. After receiving the video signal of the first frame Y1+C1, the video signal of the first frame Y1+C1 is delayed to await the video signal of the second frame Y2−C2.

The signal difference Y1−Y2+C1+C2 is determined by the delayed video signal of the first frame Y1+C1 and the video signal of the second frame Y2−C2. The signal difference Y1−Y2+C1+C2 is filtered by a low-pass filter to obtain the luminance difference Y1−Y2, and the signal sum Y1+Y2+C1−C2 is filtered by a low-pass filter to obtain the luminance sum Y1+Y2. Furthermore, absolute circuits are optionally used to ensure that the luminance difference Y1−Y2 and the chrominance difference C1−C2 are preferably positive values.

In addition, the luminance difference Y1−Y2 is compared to a first reference value to obtain a first comparing value (step 408), and the chrominance difference C1−C2 is compared to a second reference value to obtain a second comparing value (step 418). Whether the successive video signals Y1+C1 and Y2−C2 are moving or not is decided according to at least one of the first comparing value and the second comparing value (step 410).

Figure 5:
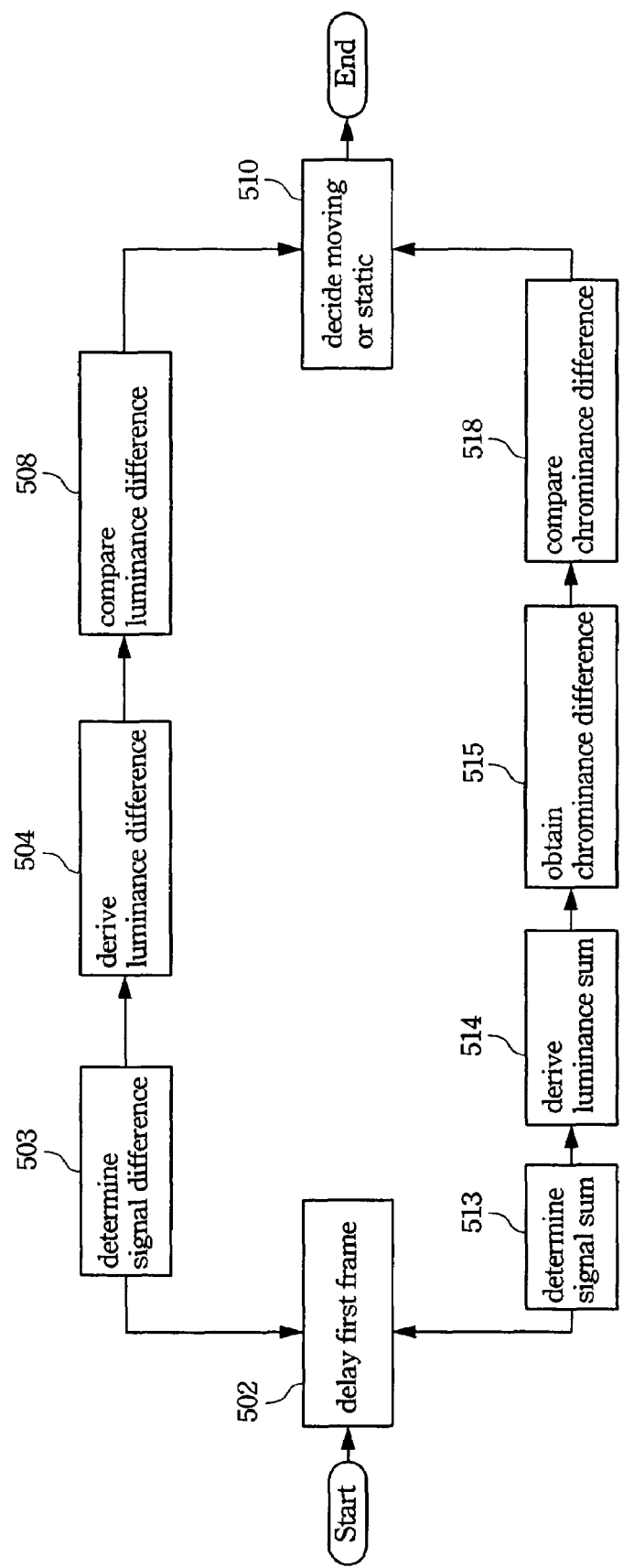
FIG. 5 is a flow chart of another preferred embodiment of the present invention.

FIG. 5 is a flow chart of another preferred embodiment of the present invention. For clarity, the following descriptions are made with reference to FIGS. 3A and 3B. A video signal of a first frame Y1+C1 is delayed (step 502). A signal difference Y1−Y2+C1+C2 between the delayed video signal of the first frame Y1+C1 and a video signal of a second frame Y2−C2 and a signal sum Y1+Y2+C1−C2 of the delayed video signal of the first frame Y1+C1 and the video signal of the second frame Y2−C2 are determined (steps 503 and 513). A luminance difference Y1−Y2 is derived from the signal difference Y1−Y2+C1+C2 (step 504). A luminance sum Y1+Y2 is derived from the signal sum Y1+Y2+C1−C2 (step 514), and a chrominance difference C1−C2 is obtained by subtracting the luminance sum Y1+Y2 from the signal sum Y1+Y2+C1−C2 (step 515).

More precisely, the video signals are successive composite television signals, such as composite NTSC video signals, each of which having luminance and chrominance information. The signal difference Y1−Y2+C1+C2 is determined by subtracting the video signal of the second frame Y2−C2 from the delayed video signal of the first frame Y1+C1. The signal sum Y1+Y2+C1−C2 is determined by adding the video signal of the second frame Y2−C2 and the delayed video signal of the first frame Y1+C1. The luminance difference Y1−Y2 is derived by low-pass filtering the signal difference Y1−Y2+C1+C2, and the luminance sum Y1+Y2 is derived by low-pass filtering the signal sum Y1+Y2+C1−C2. Furthermore, absolute circuits are optionally used to ensure that the luminance difference Y1−Y2 and the chrominance difference C1−C2 are preferably positive values.

In addition, the luminance difference Y1−Y2 is compared to a first reference value to obtain a first comparing value (step 508), and the chrominance difference C1−C2 is compared to a second reference value to obtain a second comparing value (step 518). Whether the two video signals Y1+C1 and Y2−C2 are moving or not is decided according to at least one of the first comparing value and the second comparing value (step 510).

In conclusion, the motion detection circuit of the preferred embodiment omits one frame delay. The occupied area and the frame buffers are reduced, such that the chip size can be shrunk and the cost also can be decreased. Moreover, the methods of the preferred embodiments omit one frame delay step and need only two frames rather than three frames, thus simplifying the conventional method.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for detecting frame motion, comprising the steps of:
   receiving successive video signals of a first frame and a second frame;
   determining a signal difference between the video signals;
   filtering the signal difference to obtain a luminance difference;
   determining a signal sum of the video signals;
   filtering the signal sum to obtain a luminance sum; and
   subtracting the luminance sum from the signal sum to obtain a chrominance difference.

2. The method as claimed in claim 1, wherein the video signals are composite television signals, and each of the video signals comprises luminance and chrominance information.

3. The method as claimed in claim 1, further comprising:
   delaying the video signal of the first frame after receiving the video signal of the first frame to await the video signal of the second frame;
   wherein the signal difference is determined by the delayed video signal of the first frame and the video signal of the second frame.

4. The method as claimed in claim 1, wherein the signal difference is filtered by a low-pass filter to obtain the luminance difference; and
   the signal sum is filtered by a low-pass filter to obtain the luminance sum.

5. The method as claimed in claim 1, further comprising:
   comparing the luminance difference to a first reference value to obtain a first comparing value;
   comparing the chrominance difference to a second reference value to obtain a second comparing value; and
   deciding whether the successive video signals are moving or not according to at least one of the first comparing value and the second comparing value.

6. A method for detecting frame motion, comprising the steps of;
   delaying a video signal of a first frame;
   determining a signal difference between the delayed video signal of the first frame and a video signal of a second frame;
   determining a signal sum of the delayed video signal of the first frame and the video signal of the second frame;
   deriving a luminance difference from the signal difference;
   deriving a luminance sum from the signal sum; and
   obtaining a chrominance difference by subtracting the luminance sum from the signal sum.

7. The method as claimed in claim 6, wherein the video signals are successive composite television signals, and each of the video signals comprises luminance and chrominance information.

8. The method as claimed in claim 6, wherein the signal difference is determined by subtracting the video signal of the second frame from the delayed video signal of the first frame; and
   the signal sum is determined by adding the video signal of the second frame and the delayed video signal of the first frame.

9. The method as claimed in claim 6, wherein the luminance difference is derived by low-pass filtering the signal difference; and
   the luminance sum is derived by low-pass filtering the signal sum.

10. The method as claimed in claim 6, further comprising:
    comparing the luminance difference to a first reference value to obtain a first comparing value;
    comparing the chrominance difference to a second reference value to obtain a second comparing value; and
    deciding whether the two video signals are moving or not according to at least one of the first comparing value and the second comparing value.

11. A motion detection circuit, comprising:
    a frame delay, arranged to delay a video signal of a first frame;
    a luminance subtracter, arranged to determine a signal difference between the delayed video signal of the first frame and a video signal of a second frame;
    a luminance digital filter, arranged to derive a luminance difference from the signal difference;
    an adder, arranged to determine a signal sum of the delayed video signal of the first frame and a video signal of a second frame;
    a chrominance digital filter, arranged to derive a luminance sum from the signal sum; and
    a chrominance subtracter, arranged to subtract the luminance sum from the signal sum to obtain a chrominance difference.

12. The motion detection circuit as claimed in claim 11, wherein the video signals are successive composite television signals, and each of the video signals comprises luminance and chrominance information.

13. The motion detection circuit as claimed in claim 11, wherein the luminance subtracter is arranged to subtract the video signal of the second frame from the delayed video signal of the first frame to determine the signal difference; and the adder is arranged to add the video signal of the second frame and the delayed video signal of the first frame to determine the signal sum.

14. The motion detection circuit as claimed in claim 11, wherein the luminance digital filter and the chrominance digital filter are low-pass filters.

15. The motion detection circuit as claimed in claim 11, further comprising:

a luminance comparator, arranged to compare the luminance difference to a first reference value to obtain a first comparing value;

a chrominance comparator, arranged to compare the chrominance difference to a second reference value to obtain a second comparing value; and a logic gate, arranged to decide whether the two video signals are moving or not according to at least one of the first comparing value and the second comparing value.

* * * * *